United States Patent

Drinkard, Jr. et al.

[15] 3,676,475

[45] July 11, 1972

[54] HYDRIDES OF NICKEL COORDINATION COMPOUNDS

[72] Inventors: William C. Drinkard, Jr., Wilmington; Richard V. Lindsey, Hockessin, both of Del.

[73] Assignee: E. I. du Pont de Nemours and Company, Wilmington, Del.

[22] Filed: July 6, 1970

[21] Appl. No.: 52,701

Related U.S. Application Data

[63] Continuation-in-part of Ser. No. 847,442, Aug. 4, 1960, Pat. No. 3,538,142, which is a continuation-in-part of Ser. No. 682,623, Nov. 13, 1967, abandoned.

[52] U.S. Cl....................260/439 R, 260/465.8 R, 260/465.9
[51] Int. Cl. ........................................................C07f 15/04
[58] Field of Search...................................................260/439

[56] References Cited

UNITED STATES PATENTS

| | | | |
|---|---|---|---|
| 3,133,943 | 5/1964 | Chatt et al. | 260/439 |
| 3,328,443 | 6/1967 | Clark et al. | 260/439 |
| 3,270,087 | 8/1966 | Heck | 260/683.9 |

OTHER PUBLICATIONS

Chatt et al. Proc. Chem. Soc. 1957 p. 343
Green et al. Z. Naturporsch 14b (1959) p. 738
Cariati et al. Chem. and Ind. London 1964, p. 1714– 1715

*Primary Examiner*—Tobias E. Levow
*Assistant Examiner*—A. P. Demers
*Attorney*—William A. Hoffman

[57] ABSTRACT

Hydrides of nickel coordination compounds of the general formula $HNi(MYZ)_n{}^+X^-$ where M is P, As or Sb, Z is R or OR, where R is a hydrocarbyl radical of up to 18 carbon atoms or a hydrocarbyl radical of up to 18 carbon atoms substituted with any of —Cl, —O— or —CN, where Y is two Z's or either —R'— or —O—R'—O—, where —R'— is a divalent hydrocarbylene radical of from two to 12 carbon atoms, $n$ is 3 or 4, and $X^-$ is an anion of a protonic acid, particularly $HSO_4{}^-$, $Cl^-$, $Br^-$, $CN^-$, $CF^3COO^-$, $AlCl_4{}^-$, or $ZnCl_2CN^-$ or $BF_4{}^-$ and the process of preparing these hydrides from the corresponding nickel complex and acid as well as the process of isomerizing 3-pentenenitrile to 4-pentenenitrile using the hydrides.

16 Claims, No Drawings

HYDRIDES OF NICKEL COORDINATION COMPOUNDS

CROSS-REFERENCE TO RELATED APPLICATION

This application is a continuation-in-part of U.S. Pat. application Ser. No. 847,442 filed Aug. 4, 1969, by William C. Drinkard, Jr. and Richard V. Lindsey, Jr., now U.S. Pat. No. 3,538,142, issued Nov. 3, 1970, which in turn is a continuation-in-part of U.S. Pat. application Ser. No. 682,623 filed Nov. 13, 1967, by the same inventors and now abandoned.

BACKGROUND OF THE INVENTION

Nickel coordination complexes derived from nickel tetracarbonyl by the replacement of all four carbonyls with an arsine, arsenite, stibite, stibine, phosphite or phosphine are disclosed in U.S. Pat. No. 3,328,443, issued June 27, 1967 to Reginald F. Clark, et al. These complexes are further disclosed as being useful in the dimerization, trimerization and polymerization of butadiene.

The present invention relates to hydrides of nickel coordination compounds having the general formula $HNi(MYZ)_nX$ wherein M is selected from the class consisting of P, As and Sb, wherein Z is selected from the class consisting of R and OR wherein R is selected from the class consisting of hydrocarbyl radicals of up to 18 carbon atoms and hydrocarbyl radicals of up to 18 carbon atoms substituted with groups selected from the class consisting of —Cl, —O—, and -CN, whereby Y is selected from the class consisting of two Z's and groups of the formula —R'— and —O—R'—O— wherein —R'— is a divalent hydrocarbylene radical of from two to 12 carbon atoms, wherein $n$ is an integer of from 3 to 4, and X is the anion of an acid. The various R's in a given compound may be the same or different. These compounds are generally prepared in solution by treating a compound of the formula $Ni(MYZ)_4$ wherein M, Y, and Z have the meanings defined above, with an acid of the general formula HX to attach a proton directly to nickel to give a compound of the formula $HNi(MYZ)_4{}^+XCHc$.

Suitable anions for use as $X^-$ generally include the anionic portion of a protonic acid, such as $HSO_4{}^-$, $Cl^-$, $CF_3COO^-$, $AlCl_4{}^-$, $Br^-$, $CN^-$, $ZnCl_2CN^-$ or $BF_4{}^-$. The acid may have sufficient inherent strength in the parent acid to form the hydride, or the acid strength of weak acids may be enhanced by the addition of Lewis acids.

The solvent is not critical and any liquid capable of dissolving the nickel complex starting material may be used. Generally, organic solvents such as benzene, toluene, p-xylene, acetone, 3-pentenenitrile, chloroform, nitrobenzene, ether, methyl ethyl ketone, adiponitrile, 2-methyl-3-butenenitrile, dioxane, triphenyl phosphite, tritolyl phosphite, or tetrahydrofuran may be used.

The nickel complex being used and the acid being used are generally reacted at from −50° to 150°C. to form the hydrides. The reaction time is not critical and the reaction appears to begin immediately on contact of the acid and the nickel complex with completion of hydride formation generally occurring within about five minutes. The solvent can readily be removed by applying a vacuum to the solution. The hydrides of the present invention are not particularly thermally stable and therefore the solvent generally should be removed by applying the vacuum at a temperature below 25°C. and preferably below −10°C. The amount of vacuum applied is not particularly critical and may be any pressure of from about 1 micron of mercury up to the vapor pressure of the solvent being used at the temperature being used. Generally, a pressure of less than one-half atm. is preferred.

The hydrides of the present invention are best identified by nuclear magnetic resonance according to the principles explained on pages 127–135 of "Advances in Inorganic Chemistry and Radio-chemistry," Volume 7, by H. J. Emeleus and A. G. Sharpe published by Academic Press, New York and London, (1965). Perhaps the best indication of the Ni-H bond is the resonance in the area of 12–45τ and particularly 20–30τ as set forth on page 127 of this work.

The hydrides of the present invention are useful as catalysts in the isomerization of olefins such as isomerizing 3-pentenenitrile to 4-pentenenitrile, and in the hydrocyanation of organic compounds having ethylenic carbon-carbon unsaturation. This isomerization of olefins generally can be carried out at from −50° to 200°C. and preferably at from 0° to 120°C. in the liquid phase. If desired, an inert diluent may also be employed but its use is not preferred generally.

DESCRIPTION OF THE PREFERRED EMBODIMENTS

EXAMPLE I

This Example is carried out in a dry box under a nitrogen gas blanket using diethyl ether solvent and 3-pentenenitrile which have been deoxygenated by bubbling nitrogen gas therethrough under a nitrogen atmosphere.

A round bottom, 25 ml glass flask equipped with a gas outlet for solvent stripping gas purge and a Teflon covered magnetic stirring bar is charged with 5 ml. of diethyl ether into which is dissolved 0.73 g. (1 mmole) of $Ni[P(OC_2H_5)_3]_4$. The solution is cooled to about −50°C. by partially immersing the flask in an acetone bath cooled with dry ice. An ether solution of 0.10 g (1 mmole) concentrated sulfuric acid in 5 ml. of diethyl ether at about −50°C. is added to the solution in the flask. A cloudy yellow solution then forms in the flask. The diethyl ether is removed into a liquid nitrogen cooled trap under a pressure of $10^{-3}$atm. while rapidly stirring and allowing the acetone bath to gradually warm to −20°C. The final solvent-free hydride product, 0.83 g., is a waxy yellow solid at −20°C.

The product prepared above is allowed to remain in the flask and 8.14 g. (100 mmoles) of 3-pentenenitrile free of 4-pentenenitrile cooled to −10°C. is added to the flask. The acetone bath now is maintained at −30°C. The hydride dissolves completely to give a bright yellow solution. The solution is allowed to warm gradually over a period of 45 minutes at which time a temperature of 25°C. is reached. As the solution warms, the color gradually turns to a deep reddish orange.

Gas chromatographic analysis indicates that the flask contains cis and trans 3-pentenenitrile and 4-pentenenitrile, with no appreciable amounts of the conjugated 2-pentenenitrile.

The similarly prepared hydride is characterized in other preparations. Most important, the proton NMR (nuclear magnetic resonance) spectrum of the solvent-free hydride redissolved in dichloromethane shows a symmetrical quintet at 19.5 ppm to high field of solvent dichloromethane (24.1τ) $J_{PH}=25$ cps (cycles per second). The infrared spectra of the dichloromethane solution and of the neat compound pressed between sodium chloride plates show a band at 1970 cm$^{-1}$ attributed to the nickel hydrogen stretching vibration. The assignment is confirmed by preparing the corresponding deuteride from $D_2SO_4$ and finding a major reduction in the intensity of the 1970 cm$^{-1}$ band. This indicates the presence of the compound $HNi[P(OC_2H_5)_3]_4HSO_4$.

The hydride is a yellow waxy oil at room temperature which darkens gradually on standing even under a blanket of nitrogen gas. It turns green within minutes on exposure to air. It is soluble in dichloromethane and methanol but insoluble in diethyl ether or petroleum ether. The solubility properties of the hydride are consistent with an ionic organometallic compound. In contrast the starting $Ni[P(OC_2H_5)_3]_4$ is quite soluble in all four solvents mentioned.

EXAMPLE II

A solution containing 0.515 g. of $Ni[P(OC_2H_5)_3]_4$ in 0.5 ml of benzene is prepared in a 5 ml. glass vial in a nitrogen atmosphere at ambient temperature. The solution is transferred to a sealed NMR tube equipped with a serum cap and 110 microliters of pure $CF_3CO_2H$ is added. A modified HA-100 Varian NMR spectrometer is used to scan the proton region from the 20 to 30 ppm region. A quintet centered at 24.47τ with a splitting coupling constant of J = 27 cps. is observed. Such a multiplet requires that the hydride hydrogen be split by four equivalent phosphorus groups. This indicates the presence of the compound HNi[P(OC₂H₅)₃]₄CF₃CO₂.

EXAMPLE III

A solution of 0.514 g. of Ni[P(OC₂H₅)₃]₄ in 0.50 ml. of benzene is prepared in a 5 ml. glass vial in a nitrogen gas atmosphere at ambient temperature. The solution is transferred to a sealed NMR tube equipped with a serum cap. Fifty-six microliters of liquid hydrogen cyanide are added and the solution analyzed using a modified HA-100 Varian NMR Spectrometer. A quartet centered at 26.87τ with a splitting constant of 29 cps is observed. Such a multiplet requires that the hydride hydrogen be split by three equivalent phosphorus atoms. Thus the hydride has the formula HNi[P(OC₂H₅)₃]₃CN.

EXAMPLE IV

A solution containing 0.516 g. of Ni[P(OC₂H₅)₃]₄, 0.097 g. of ZnCl₂, 50 microliters of benzene (for NMR reference) and 0.50 ml of tetrahydrofuran is prepared in a 5 ml glass vial in a nitrogen gas atmosphere at ambient temperature. The solution is transferred to a sealed NMR tube equipped with a serum cap. Fifty microliters of liquid hydrogen cyanide is then added to the solution.

A modified HA-100 Varian NMR spectrometer is used to analyze the solution. Two multiplets are observed. One is a quintet centered at 24.27τ with a splitting constant J = 29 cps. The other is a quartet centered at 26.32τ with a splitting constant J = 29 cps. The quintet is at essentially the same position as the quintet found for the hydride of Example II. The quartet is at essentially the same position as the quartet found for NHi[P(OC₂CQ5)₃]₃CN (Example III). This Example illustrates that a Lewis acid (ZnCl₂) increases the strength of the HCN to aid in formation of HNi[P(OC₂H₅)₃]₃CN hydride.

EXAMPLE V

A solution containing 0.516 g. of Ni[P(OC₂H₅)₃]₄, 0.097 g of ZnCl₂, 50 microliters of benzene (for NMR reference), and 0.50 ml of tetrahydrofuran is prepared in a 5 ml glass vial in a nitrogen atmosphere. The solution is transferred to a sealed NMR tube equipped with a serum cap and 50 microliters of liquid hydrogen cyanide is added. An IR (infrared) cell is filled with this solution, using a syringe. Using a reference cell containing tetrahydrofuran an IR spectrum is obtained with a Perkin-Elmer Infrared Spectrometer. Peaks are found in the CN stretching region at 2,085 cm⁻¹, 2,100 cm⁻¹ and 2,130 cm⁻¹. The latter three peaks result from CN in different environments to be expected from the following nickel hydride species.
A. HNi[P(OC₂H₅)₃]₃CN,
B. HNi[P(OC₂H₅)₃]₄⁺CNZnCl₂⁻.

EXAMPLE VI

A solution containing 0.58 g. of

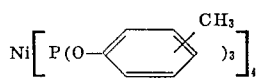

0.06 g. of ZnCl₂ and 0.50 g. of tetrahydrofuran is prepared in a 5 ml glass vial in a nitrogen atmosphere at ambient temperature. The solution is transferred to a sealed NMR tube equipped with a serum cap. Thirty microliters of liquid hydrogen cyanide are then added by means of a syringe to the solution. The solution is then analyzed using a modified HA-100 Varian NMR Spectrometer. A quartet centered at 25.4τ with splitting constant J = 30 cps is observed. This multiplet requires that the hydride hydrogen be split by three equivalent phosphorus groups as in

EXAMPLE VII

A solution containing 0.34 g. of Ni[P(OC₂H₅)₃]₄ and 0.5 ml of benzene is prepared in a 5 ml glass vial sealed with a serum cap under a nitrogen atmosphere at ambient temperature. Nineteen microliters of liquid hydrogen cyanide are added to the solution after which an infrared cell is filled with the solution by means of a syringe. Using a reference cell containing benzene, an IR spectrum is recorded with a Perkin-Elmer Infrared Spectrometer. In the CN stretching region peaks are observed at 2,085 cm⁻¹ (unassociated HCN) and 2,130 cm⁻¹. The latter peak results from CN in a different environment as to be expected in the compound HNi[P(OC₂H₅)₃]₃CN.

EXAMPLE VIII

A solution containing 0.302 g. of

0.033 g. of ZnCl₂, and 0.5 ml of tetrahydrofuran is prepared in a 5 ml glass vial in a nitrogen atmosphere at ambient temperature. The solution is transferred to an NMR tube equipped with a serum cap, and 30 microliters of liquid hydrogen cyanide are added. The solution is analyzed using a modified HA-100 Varian Spectrometer. A quartet centered at 25.5τ with coupling constant J = 30 cps is observed. This multiplet requires that the hydride hydrogen be split by three equivalent phosphorus groups as in

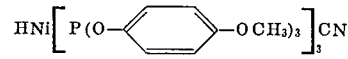

EXAMPLE IX

In a nitrogen atmosphere a solution is prepared in an NMR tube by dissolving 0.16 g. of Ni[PC₆H₅(OC₂H₅)₂]₄ in CDCl₃ to a total volume of 0.5 ml. Tetramethylsilane is added as an internal reference. The tube is capped and chilled to −78°C. in a "Dry Ice"/"Triclene" bath. Twelve microliters of concentrated sulfuric acid are added to the tube by means of a syringe. The solution is shaken and a proton NMR spectrum run at 0°C. A sharp hydride quintet resonance at 23.4τ (J_{PH}=22.5 cps) indicates the presence of HNi[PC₆H₅(OC₂H₅)₂]₄HSO₄.

EXAMPLE X

In a nitrogen atmosphere a solution is prepared in an NMR tube dissolving 0.85 g. Ni[PC₆H₅(OC₂H₅(OC₂H₅)₂]₄ in CH₂Cl₂ to a total volume of 0.5 ml. With the addition of 160 microliters of HCN the color of the solution turns brown and the ³¹P NMR spectrum contains a new resonance, doublet, at −39.0 ppm from P₄O₆(J_{PH} = 30 cps), assigned to the phosphorus resonance in HNi[PC₆H₅(OC₂H₅)₂]₃CN. The proton NMR spectrum of the same solution showed the expected hydride quartet at 26.4 (J_{PH} = 33 cps). The infrared spectrum of the same solution showed the presence of an absorption of 2,113 cm⁻¹ due to —CN in HNi[PC₆H₅(OC₂H₅)₂]₃CN.

EXAMPLE XI

In a nitrogen atmosphere a solution is prepared in an NMR tube by dissolving Ni[P(OCH₂CH₂Cl)₃]₄ in CDCl₃ to a total volume of 0.5 ml. Tetramethylsilane is used as an internal reference. The tube is capped and chilled to −78°C. in dry ice.

Ten microliters of concentrated sulfuric acid is added to the tube. On shaking, a bright yellow oil separates. The $CDCl_3$ is removed with a vacuum pump and $CH_2Cl_2$ added to give a homogeneous solution. A hydride quintet at 23.97 ($J_{PH} = 28$ cps) indicates the presence of $HNi[P(OCH_2CH_2Cl)_3]_4HSO_4$.

In EXamples XII to XIV all procedures are conducted either in an evacuated system or in an inert atmosphere. Solvents are dried on Linde molecular sieves except for tetrahydrofuran Examples is distilled from $LiAlH_4$. The $[(C_6H_A)'_2PCH_2CH_2P(C_6H_5)_2]_2Ni$ is prepared by reduction of $[(C_6H_A)'_2PCH_2CH_2P(C_6H_5)_2]_2NiBr_2$ with $NaBH_4$. Tetramethylsilane is used as an internal reference in recording the proton NMR spectra.

EXAMPLE XII

A 500 ml. round-bottom flask is charged with 5.0 g (5.9 mmole) of $[(C_6H_5)_2PCH_2CH_2P(C_6H_5)_2]_2Ni$, and 150 ml. toluene. Upon addition of 0.8 g. (6.0 mmoles) of sublimed $AlCl_3$, a dark brown oil forms. The mixture is degassed and 6.0 mmoles of anhydrous HCl is condensed into the flask. The mixture is then stirred at 25°C. for 20 hours during which time an orange precipitate has formed. The precipitate is collected and extracted with 90 ml of tetrahydrofuran and 90 ml of toluene is added to the orange-red filtered extract. The solution is kept at —25°C. for 18 hours after which the orange prisms which have formed are collected, washed with toluene and dried at 25°C. under 0.1 micron Hg pressure for 2 hours to give 3.9 g (65%) of $[(C_6H_5)_2PCH_2CH_2P(C_6H_5)_2]_2NiH(AlCl_4)$, m.p. 198°–203°C. Analysis calculated for $C_{52}H_{49}AlCl_4NiP_4$: C, 61.0; H, 4.8; Al, 2.6; Cl, 13.8; Ni, 5.7; P, 12.1. Found: C, 60.7; H, 4.9; Al, 2.6; Cl, 13.8; Ni, 5.7; P, 11.9.

The infrared spectrum of the crude product shows $\nu_{Ni\text{-}H}$ at 1950 $cm^{-1}$ as a single absorption, but the recrystallized sample shows two bands at 1,949 and 1,916 $cm^{-1}$. Solution infrared spectra in $CHCl_3$ and tetrahydrofuran shows only one weak, broad absorption at 1950 $cm^{-1}$. The high field proton NMR spectrum of the recrystallized sample shows Ni–H at 22.95τ in tetrahydrofuran, 23.07τ in $CD_2Cl_2$, and 23.00τ in $CH_3OH$. The fine structure is resolved only in $CH_3OH$ as a quintet with $J_{P\text{-}H} = 6$ cps.

EXAMPLE XIII

A mixture of $AgBF_4$ (0.5 g, 2.6 mmoles) and 20 ml of 1,2-dimethoxyethane is degassed in a flask under vacuum. Anhydrous HCl (3.0 mmoles) is condensed into the flask and the mixture is stirred at 25°C. for 1 hour. The resulting solution of $HBF_4$ is filtered, to remove AgCl, directly into a solution of $[(C_6H_A)'_2PCH_2CH_2P(C_6H_5)_2]_2Ni$ (1.95 g., 2.3 mmoles) in 50 ml. of 1,2-dimethoxyethane. The yellow solution rapidly turns organe, and an orange crystalline solid is precipitated. After stirring the mixture at 25°C. for 1 hour, the crude product is collected, extracted with a total of 800 ml. of hot tetrahydrofuran, and the filtered extract is concentrated to 100 ml. under vacuum. After storage at —20°C. for 65 hours, the solution is filtered, the orange crystalline solid is washed with tetrahydrofuran, and dried at 25°C. under 0.1 micron of Hg pressure for 16 hours to give 1.1 g (51%) of $[(C_6H_5)_2PCH_2CH_2P(C_6H_5)_2]_2NiH$ ($BF_4$), m.p. 190°C. Calculated analysis for $C_{52}H_{49}BF_4NiP_4$: C, 66.4; H, 5.1; F, 8.1; N, 6.2; P, 13.2. Found: C, 65.9; H, 5.4; F, 7.7; Ni, 6.1; P, 13.9.

The infrared spectrum (Nujol mull) shows $\nu_{Ni-H}$ at 1,950 $cm^{-1}$ in addition to bands characteristic of $BF_4$ and $(C_6H_5)_2PCH_2CH_2(C_6H_5)_2$; the proton NMR spectrum shows Ni-H at 23.01τ in $CD_2Cl_2$ solution; no fine structure is observed.

EXAMPLE XIV

Anhydrous HCl (16.5 mmoles) is condensed into a degassed solution of $[(C_6H_5)_2PCH_2CH_2P(C_6H_5)_2]_2Ni$ (5.0 g. mmoles) in 150 ml. of toluene. After being stirred at 25°C. for 3 hours the orange precipitate which has formed is collected, washed with toluene and dried at 25°C. under 0.5 micron Hg pressure for 16 hours to give 5.3 g. (96%) of orange $[(C_6H_5)_2PCH_2CH_2P(C_6H_5)_2]_2NiH(HCl_2)$, m. p. darkens 145°C., decomposes 190°C. Calculated Analysis for $C_{52}H_{50}Cl_2NiP_4$: C, 67.2 H, 5.4; Cl, 7.7; Ni, 6.3; P, 13.3. Found: C, 66.7; H, 5.2; Cl, 8.2; N, 6.3; P, 13.3. Attempts to recrystallize this product lead to decomposition.

The infrared spectrum (Nujol mull) shows $\nu_{Ni-H}$ at 1,934 $cm^{-1}$ in addition to bands characteristic of $(C_6H_5)_2PCH_2CH_2P(C_6H_5)_2$. In the proton NMR spectra of fresh $CD_2Cl_2$ solutions, the resonance observed at —3.22τ (area = 1) is assigned to the $HCl_2^-$ anion while an unresolved Ni-H resonance appears at 23.02τ (area = 1).

EXAMPLE XV

A solution of 0.2 g.

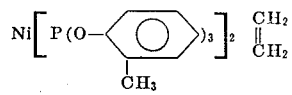

in 0.7 ml. toluene is prepared in a 5 ml. glass vial in a nitrogen atmosphere at ambient temperature. The solution is transferred to a sealed NMR tube equipped with a serum cap. The NMR tube is placed in a Dry ice — acetone bath and 20 micro-liters of pure liquid HCN are added. The NMR tube is placed in the sample tube holder of a modified HA–100 Varian NMR spectrometer. The proton region is scanned from 20 to 30 ppm (τ) with the tube being initially cooled to —60°C. The quartet is centered at 25.00τ with a splitting coupling constant of J = 36 cps. Such a multiplet requires that the hydride hydrogen be split by three equivalent phosphorous groups. This indicates the presence of the compound

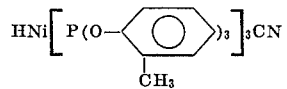

Examples XVI to XXVII further illustrate the hydrides of this invention. Examples XVI to XXII are made by the method illustrated in EXample IV; EXamples XXIII to XXVIII are by the method of Example XI. All samples are prepared in a

TABLE I

| Example | Nickel compound Complex | Grams | HCN, ml. | Temperature | Lewis acid Compound | Grams | Solvent Compound | Milliliters | Quintet τ J(cps.) | | Quartet τ J(cps.) | |
|---|---|---|---|---|---|---|---|---|---|---|---|---|
| XVI | $Ni[P(OC_2H_5)_3]_4$ | 0.28 | 27 | Ambient | $BO_3$ | 0.18 | $CH_3CN$ | 0.5 | 24.37 | 27.0 | 26.40 | 33.0 |
| XVII | $Ni[P(OC_2H_5)_3]_4$ | 0.28 | 27 | do | $BO_3$ | 0.09 | THF | 0.5 | 24.34 | 26.0 | 26.37 | 30.0 |
| XVIII | $Ni[P(OC_2H_5)_3]_4$ | 0.28 | 30 | do | $BO_3$ | 0.19 | THF | 0.5 | 24.30 | 26.0 | 26.20 | 30.0 |
| XIX | $Ni[P(OC_2H_5)_3]_4$ | 0.28 | 27 | do | $AlCl_3$ | 0.05 | THF | 0.5 | 24.34 | 26.0 | 26.08 | 30.0 |
| XX | $Ni[P(OC_2H_5)_3]_4$ | 0.28 | 27 | do | $AlCl_3$ | 0.11 | THF | 0.5 | 24.38 | 26.0 | 26.12 | 30.0 |
| XXI | $Ni[P(OC_2H_5)_3]_4$ | 0.28 | 27 | do | $AlCl_3$ | 0.11 | $CH_3CN$ | 0.5 | 24.66 | 26.0 | 25.82 | 24.0 |
| XXII | $Ni[P(OC_2H_5)_3]_4$ | 0.28 | 27 | do | $ZnCl_2$ | 0.05 | $CH_3CN$ | 0.5 | 24.60 | 26.0 | 26.60 | 30.0 |
| XXIII | $Ni[C_2H_5P(OC_2H_5)_2]_4$ | 0.25 | 35 | do | | | $C_6H_6$ | 0.5 | | | 26.10 | 34.0 |
| XXIV | $Ni[(C_6H_5)_2PCH_3]_4$ | 0.26 | 35 | —10° C | $ZnCl_2$ | 0.08 | $CH_3CN$ | 0.5 | | | 26.82 | 36.0 |
| XXV | $Ni[(C_6H_5)_2PCH_3]_4$ | 0.26 | 35 | Ambient | $ZnCl_2$ | 0.08 | THF | 0.5 | | | 27.06 | 34.0 |
| XXVI | $Ni[(C_6H_5)_2POCH_3]_4$ | 0.28 | 35 | do | $ZnCl_2$ | 0.08 | $CH_3CN$ | 1.0 | | | 25.86 | 36.0 |
| XXVII | $Ni[P(O\text{-}C_6H_4\text{-}OCH_3)_3]_4$ | 0.5 | 36 | do | $BO_3$ | 0.16 | THF | 0.5 | | | 25.46 | 32.0 |
| XXVIII | Same as above | 0.5 | 36 | do | $AlCl_3$ | 0.09 | THF | 0.5 | | | 25.30 | 34.0 | nitrogen atmosphere; the solutions are transferred to NMR tubes by means of a syringe; the NMR tubes, sealed with serum caps, are analyzed at room temperature by means of a modified HA-100 NMR spectrometer.

We claim:

1. A complex having the formula $HNi(PZ_3)_n{}^+X^-$ wherein Z is selected from the class consisting of R and OR wherein R is selected from the class consisting of hydrocarbyl radicals of up to 18 carbon atoms and hydrocarbyl radicals of up to 18 carbon atoms substituted with groups selected from the class consisting of —Cl and —O—, wherein $n$ is an integer of from 3 to 4 and $X^-$ is an anion of a protonic acid.

2. The complex of claim 1 wherein $X^-$ is selected from the class consisting of $HSO_4^-$, $Cl^-$, $Br^-$, $CN^-$, $CF_3COO^-$, $AlCl_4^-$, $ZnCl_2CN^-$ and $BF_4^-$.

3. The complex of claim 2 wherein Z is R.
4. The complex of claim 2 wherein Z is OR.
5. The complex of claim 3 wherein R is alkyl.
6. The complex of claim 3 wherein R is aryl.
7. The complex of claim 4 wherein R is alkyl.
8. The complex of claim 4 wherein R is aryl.

9. A process of forming a hydride having the formula $HNi(PZ_3)_n\text{b?}X^-$ wherein Z is selected from the class consisting of R and OR wherein R is selected from the class consisting of hydrocarbyl radicals of up to 18 carbon atoms, and hydrocarbyl radicals of up to 18 carbon atoms substituted with groups selected from the class consisting of —Cl and —O—, wherein "n" is an integer of from 3 to 4 and $X^-$ is an anion of a protonic acid which comprises contacting a compound having the formula $Ni(PZ_3)_n$ wherein Z and $n$ have the meanings defined above; with a protonic acid of the formula $H^+X^-$ at from $-50°$ to $150°C$.

10. The process of claim 9 wherein $X^-$ is selected from the class consisting of $HSO_4^-$, $Cl^-$, $Br^-$, $CN^-$, $CF_3COO^-$, $AlCl_4^-$, and $ZnCl_2CN^-$ 11. The process of claim 10 wherein Z is R.
12. The process of claim 10 wherein Z is OR.
13. The process of claim 11 wherein R is alkyl.
14. The process of claim 11 wherein R is aryl.
15. The process of claim 12 wherein R is alkyl.
16. The process of claim 12 wherein R is aryl.

* * * * *

PO-1050
(5/69)

UNITED STATES PATENT OFFICE
CERTIFICATE OF CORRECTION

Patent No. 3,676,475      Dated July 11, 1972

Inventor(s) William C. Drinkard, Jr. and Richard V. Lindsey

It is certified that error appears in the above-identified patent and that said Letters Patent are hereby corrected as shown below:

Column 3, line 33, the formula "$NHi[P(OC_2CQ5)_3]_3CN$" should read --$HNi[P(OC_2H_5)_3]_3CN$--.

Column 5, line 10, that portion of the formula reading "$[(C_6H_A)_2$" should read --$[(C_6H_5)_2$--; line 11, that portion of the formula reading "$[(C_6H_A)_2$" should read --$[(C_6H_5)_2$--.

Column 5, line 50, that portion of the formula reading "$[(C_6H_A)_2$" should read --$[(C_6H_5)_2$--.

Column 6, line 4, the formula "$C_{52}H_{49}BFB4NiP_4$" should read --$C_{52}H_{49}BF_4NiP_4$--.

Column 8, line 2, "$HNi(PZ_3)_n b?X^-$" should read --$HNi(PZ_3)_n{}^+X^-$--.

Signed and sealed this 13th day of March 1973.

(SEAL)
Attest:

EDWARD M. FLETCHER, JR.
Attesting Officer

ROBERT GOTTSCHALK
Commissioner of Patents